United States Patent
Raducha

(10) Patent No.: US 6,932,004 B2
(45) Date of Patent: Aug. 23, 2005

(54) HOSE CONSTRAINT FOR PLANTER APPARATUS

(75) Inventor: Kregg J. Raducha, Chicago, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/119,002

(22) Filed: Apr. 10, 2002

(65) Prior Publication Data

US 2003/0141419 A1 Jul. 31, 2003

Related U.S. Application Data

(63) Continuation-in-part of application No. 10/062,612, filed on Jan. 31, 2002, now Pat. No. 6,663,134.

(51) Int. Cl.[7] .............................. A01C 7/18; A01B 49/00
(52) U.S. Cl. .............................. 111/59; 172/311; 248/49
(58) Field of Search ......................... 174/48, 68.3, 101, 174/95, 96, 97, 98, 100, 68.1; 59/78.1; 248/49, 65, 68.1, 74.1, 74.4; 172/126, 272, 275, 274, 310, 311, 312, 313, 314; 111/59, 60, 65

(56) References Cited

U.S. PATENT DOCUMENTS

| | | | | |
|---|---|---|---|---|
| 2,867,681 A | * | 1/1959 | Huehnel | 174/101 |
| 3,126,444 A | * | 3/1964 | Taylor | 174/101 |
| 3,199,815 A | * | 8/1965 | Maetinkovic et al. | 248/59 |
| 3,485,937 A | * | 12/1969 | Caveney | 174/101 |
| 3,565,468 A | * | 2/1971 | Garrett | 285/373 |
| 3,711,633 A | * | 1/1973 | Ghiradi et al. | 174/135 |
| 3,744,441 A | * | 7/1973 | Smith et al. | 111/200 |
| 4,155,574 A | * | 5/1979 | Hulsey | 285/236 |
| 4,180,228 A | * | 12/1979 | Snyder et al. | 248/74.4 |
| 4,272,097 A | * | 6/1981 | Cornelius | 172/311 |
| 4,500,064 A | * | 2/1985 | Calabro | 248/539 |
| 4,643,465 A | * | 2/1987 | Green et al. | 285/236 |
| 4,721,168 A | * | 1/1988 | Kinzenbaw | 172/311 |
| 5,014,940 A | * | 5/1991 | Sherman | 248/74.1 |
| 5,080,199 A | * | 1/1992 | McCallum, III | 187/413 |
| 5,215,281 A | * | 6/1993 | Sherman | 248/74.1 |
| 5,232,054 A | * | 8/1993 | Van Blaricon et al. | 172/311 |
| 5,240,209 A | * | 8/1993 | Kutsch | 248/49 |
| 5,535,688 A | * | 7/1996 | Kaufman | 111/52 |
| 5,544,851 A | * | 8/1996 | Moore | 248/544 |
| 5,566,916 A | * | 10/1996 | Bailey | 248/230.1 |
| 5,961,248 A | * | 10/1999 | Tourtellotte | 403/400 |
| 5,971,654 A | * | 10/1999 | Sweeney, Jr. | 403/400 |
| 6,012,683 A | * | 1/2000 | Howell | 248/49 |
| 6,105,907 A | * | 8/2000 | Komsitsky | 248/71 |
| 6,142,428 A | * | 11/2000 | Kamata et al. | 248/68.1 |
| 6,213,034 B1 | * | 4/2001 | Raducha et al. | 111/57 |
| 6,227,757 B1 | * | 5/2001 | Delouvee et al. | 403/400 |
| 6,347,904 B1 | * | 2/2002 | Knighton | 403/400 |
| D469,782 S | * | 2/2003 | Paluch et al. | D15/10 |
| 6,561,535 B1 | * | 5/2003 | Paluch et al. | 280/491.2 |
| 6,666,155 B2 | * | 12/2003 | Paluch et al. | 111/54 |

* cited by examiner

Primary Examiner—Anita M. King
(74) Attorney, Agent, or Firm—Rebecca Henkel; Brant T. Maurer

(57) ABSTRACT

An apparatus for use with an agricultural assembly including at least one rigid support member and a plurality of power cables that traverse along trajectories generally aligned with a cable trajectory adjacent a mounting segment on a mounting side of the support member, the apparatus comprising a substantially rigid restraining member that forms an elongated passageway that traverses between first and second ends and that defines a minimum cross sectional area that loosely accommodates all of the cables passing therethrough and a mounting member linked to the restraining member and operable to mount the restraining member to the mounting side of the support member such that the passageway is substantially aligned with the cable trajectory wherein the cables are loosely receivable through the passageway to generally retain the cables proximate the support member.

27 Claims, 12 Drawing Sheets

HOSE CONSTRAINT FOR PLANTER APPARATUS

CROSS-REFERENCE TO RELATED APPLICATIONS

This application is a continuation in part of U.S. patent application Ser. No. 10/062,612 which was entitled "Planter Hitch Apparatus" and which was filed on Jan. 31, 2002 now U.S. Pat. No. 6,663,134.

FIELD OF THE INVENTION

The present invention relates generally to agricultural equipment and more specifically to a hose guide for use with an extendable multi-stage hitch assembly for linking an agricultural implement to a prime mover.

BACKGROUND OF THE INVENTION

Various types of agricultural implements have been developed that can be linked via an implement tongue member to a tractor hitch or other type of prime mover to facilitate different tasks including, for example, seeding, fertilizing and tilling. Hereinafter, unless indicated otherwise, the background of the invention and the present invention will be described in the context of an exemplary planter implement assembly.

While there are many different factors that have to be considered when assessing the value of a planter assembly, one relatively important factor is how quickly the assembly can accomplish the task that the assembly has been designed to facilitate. One way to increase task speed has been to increase planter assembly width thereby reducing the number of passes required to perform the implement's task for an entire field. Thus, for instance, doubling the width of the exemplary planter assembly generally reduces the time required to completely seed a field by half.

With the development of modern high-powered tractors and planter assemblies, many planter assemblies extend to operating field widths of 40 feet or more. Hereinafter when a planter assembly is extended into an operating configuration to accomplish a seeding task, the planter assembly will be said to be in an operating position and have an operating width.

Unfortunately, while expansive planter assembly operating widths are advantageous for quickly accomplishing tasks, such expansive widths cannot be tolerated during planter assembly transport and storage. With respect to transport, egresses to many fields are simply not large enough to accommodate transport of a 40 plus foot planter assembly into and out of the fields. In addition, often buildings and fences obstruct passageways and therefore will not allow transport. Moreover, many farm fields are separated by several miles and farmers have to use commercial roadways to transport their planter assemblies to and from fields. Essentially all commercial roadways are not designed to facilitate wide planter assembly transport.

Recognizing the need for expansive planter assembly operating widths and relatively narrow transport widths, the industry has developed some solutions that facilitate both transport and operating widths. To this end, one solution has been to provide piece-meal planter assemblies that can be disassembled into separate sections and stacked on a wheel supported carrier member or on a separate trailer for transport. Obviously this solution is disadvantageous as it requires excessive labor to assemble and disassemble the planter assemblies between transport and intended use and may also require additional equipment (e.g., an additional trailer).

Another solution has been to provide a folding planter assembly configuration. For instance, in a "scissors type" configuration, where a planter assembly chassis is supported by wheels, right and left implement bars are pivotally mounted to the chassis where each bar is moveable between an operating position extending laterally from the chassis and a transport position where the bar is forwardly swingable over the tongue member and supportable by the tongue member during transport. As another instance, "pivotal-type" configurations provide a single implement bar centrally mounted for pivotal movement on a wheel supported carrier platform where the single bar is pivotable about the mount so that half of the bar extends over the tongue member and is supportable thereby and the other half of the bar extends away from the tractor behind the chassis. In either of these scissors or pivotal configurations, the tongue member has to be long enough to accommodate half the implement bar length plus some clearance required to allow a tractor linked to the tongue member to turn left and right. Thus, for instance, where the planter assembly operating width is 40 feet, the tongue member generally has to be greater than 20 feet long.

While task speed is one important criteria with which to judge planter assembly value, one other important criteria is planter assembly effectiveness and efficiency. In agricultural endeavors, perhaps the most important measure of effectiveness is yield per acre. For this reason, when seeding a field, a farmer wants to seed every possible square foot of the field and thereafter, when maintaining (i.e., tilling, fertilizing, etc.) and harvesting a field, the farmer wants to avoid destroying the plants in the field. To maximize field seeding, farmers typically travel along optimal field paths. For instance, to ensure that seed is planted along the entire edge of a field, a farmer typically starts seeding the field by first traveling around the edge of the field with a seeding implement at least once and often two or more times along adjacent consecutively smaller paths prior to traveling in parallel rows through the field. These field edge paths are generally referred to in the industry as headland passes. By performing one or more headland passes about a field edge prior to performing parallel passes, the farmer provides a space for turning the tractor and implement around between parallel passes while still covering the entire space along the field edge.

While headland passes increase overall field coverage, whenever a tractor is driven over field sections that have already been seeded, the tractor and planter assembly wheels crush the seeds or growing plants that they pass over and therefore reduce overall field production (i.e., yield per acre). For this reason, as known in the industry, where possible, farmers routinely attempt to reduce the number of headland passes required in a field.

Unfortunately, the number of headland passes required to facilitate complete field coverage is related to the turning radius of a tractor and planter assembly combination and the combination turning radius is directly related to the length of the tongue member between the planter assembly and the tractor. Thus, for instance, where the tongue is six feet long the turning radius may require only one headland pass while a twenty foot long tongue may require two or more headland passes to facilitate complete coverage.

Recognizing that a short tongue during planter assembly operation reduces the number of required headland passes and therefore increases efficiency and that a long tongue is desirable to accommodate pivotal and scissors type implement configurations, some industry members have developed staged tongue members that expand to accommodate implement transport and retract to provide a minimal turning radius during implement operation. One of these solutions provides a single stage telescoping tongue member including a first tongue member mounted to a planter assembly chassis and a second tongue member that is telescopically received in the first tongue member. To facilitate expansion and retraction, a hydraulic cylinder is positioned within one of the first and second tongue members with a base member mounted to one of the tongue members and a rod secured to the other of the tongue members. With relatively large implements and tractors, the force required by the cylinder is relatively large. By placing the cylinder inside the tongue members, cylinder force is evenly distributed thereby reducing cylinder wear, reducing cylinder requirements and increasing the useful cylinder life cycle.

While better than non-telescoping tongue members, unfortunately, single stage members cannot telescope between optimal maximum and minimum lengths. For this reason, where single stage tongue members have been employed, either extended implement operating width has been minimized or extra headland passes have been used to accommodate a larger than optimum turning radius.

One other solution has been to provide a multi-stage tongue member that is able to telescope between optimal maximum and minimum lengths. Designing workable multi-stage tongue assemblies, however, has proven to be a difficult task. To this end, a separate cylinder is required for each stage in a multi-stage assembly. For instance, in a two stage assembly at least two cylinders are required. Unfortunately, in the case of a retracted multi-stage tongue assembly, the retracted assembly can only accommodate a single internally mounted cylinder (i.e., a cylinder mounted within the internal tongue assembly member). As indicated above, to balance cylinder load during operation and thereby minimize cylinder wear and increase useful cylinder lifecycle, the industry has opted to place tongue dedicated cylinders inside tongue member passageways and external tongue dedicated cylinders have not been considered a viable option.

One exemplary and seemingly workable multi-stage tongue assembly is described in U.S. Pat. No. 5,113,956 which is entitled "Forwardly Folding Tool Bar" and which issued on May 19, 1992 (hereinafter "the '956 patent"). The implement configuration in the '956 patent teaches a scissors-type implement having left and right bar members mounted to a wheel supported chassis for pivotal rotation between an extended operating position and a transport position over the tongue assembly. The tongue assembly is mounted to the chassis and extends toward a tractor including several (e.g., 5) telescoped tongue members including a distal tongue member 14 that actually links to a tractor hitch. To move the bar members between the operating and transport positions the '956 patent teaches that first and second hydraulic cylinders are mounted between the chassis and a point spaced from the chassis on each of the right and left bar members, respectively. By extending cylinder rods, the bar members are driven into extended operating positions and when the rods are retracted the bar members are driven into transport positions.

The '956 patent teaches that the tongue assembly can be extended and retracted while the bar members are driven between their operating and transport positions and by the first and second hydraulic cylinders by attaching braces between the bar members and the distal tongue member. More specifically, a first rigid brace is pivotally secured at one end about midway along the right bar member and so as to form an acute angle therewith and at an opposite end to the distal tongue member and a second rigid brace is pivotally secured at one end about midway along the left bar member so as to form an acute angle therewith and at an opposite end to the distal tongue member.

The '956 patent teaches that when the cylinder rods are retracted so that the bar members are in the transport position, the tongue assembly is extended so that the distal end of the assembly clears the ends of the bar members. When the cylinder rods are extended, the bar members are driven toward their extended operating positions and the braces simultaneously pull the distal tongue member toward the chassis thereby causing the tongue assembly to retract. By reversing the rods so that the rods extend, the braces force the distal tongue member away from the chassis thereby causing the tongue assembly to extend. Thus, the '956 patent configuration replaces the tongue dedicated rods with the first and second braces on opposite sides of the tongue assembly, the braces in effect operating as rods to extend and retract the tongue assembly and providing a balanced load to the distal tongue member during extension or retraction.

The '956 solution, like other solutions, has several shortcomings. First, because the '956 patent configuration cylinders are linked between the chassis and the bar members, in the case of some planting assemblies, the cylinders will get in the way of planting assembly components (e.g., seed metering devices, ground engaging coulters, etc.). Similarly, because of the locations of the braces (i.e., secured between central points of the braces and the distal tongue member), the braces also will obstruct use of certain planting assembly components.

Second, in order to simultaneously drive the bar members between the operating and transport positions and drive the distal tongue member between the retracted and extended positions, the cylinders have to be relatively large and therefore expensive. One way to reduce cylinder size is to modify the planter assembly configuration to increase the acute angles that the braces form with each of the bar members when the bar members are in the extended operating positions. This solution, however, leads to a third problem with the '956 patent configuration. Specifically, to simultaneously provide a workable design including braces and accommodate larger acute angles that enable the use of smaller cylinders, the overall retracted tongue assembly length must be increased which is contrary to the primary purpose for which the assembly has been designed (i.e., to reduce tongue length during planter assembly operation and increase tongue length during planter assembly transportation).

One solution to the problems above is described in the related U.S. patent application Ser. No. 10/062,612 (hereinafter "the related reference") which is entitled "Planter Hitch Apparatus", which is commonly owned with the present invention and which is incorporated herein by reference in its entirety. The related reference recognizes that where separate hydraulic cylinders have been provided for each stage in a multi-stage tongue assembly, the cylinder loads are shared between the separate cylinders and therefore the overall load requirements on each stage cylinder are reduced appreciably. Where cylinder load is reduced the cylinder can be placed "off-load" center without appreciably affecting load balance on the cylinder and therefore without appreciably reducing cylinder lifecycle.

Thus, it has been recognized that, in the case of a multi-stage tongue assembly that can accommodate only a single internally mounted cylinder, additional externally mounted cylinders can be provided for each of the additional stages. For instance, in the case of a two stage assembly, a first stage may be motivated via an internally mounted cylinder and a second stage may be motivated via an externally mounted cylinder. In this case, the external cylinder will only assume a fraction (e.g., 50%) of the overall load and therefore can be placed off-load center without appreciable effects and without a balancing cylinder on the other side of the tongue assembly.

According to one embodiment described in the related reference, a multi-stage tongue assembly includes a separate hydraulic cylinder for each stage where at least one of the cylinders is mounted externally of the tongue members (see FIGS. 1 and 7 generally). For instance, in the case of a two stage assembly including a first tongue member mounted to the underside of a carrier platform, a second tongue member telescopically received within the first member and a third tongue member telescopically received within the second member, one cylinder is mounted externally and the other cylinder may be mounted either internally or externally.

The related reference also teaches a hydraulic automated locking mechanism for locking the tongue members in extended and retracted positions. To this end, in the case of the two-stage tongue assembly described above, the locking mechanism includes two separate locking assemblies, a first assembly mounted to the distal end of a first tongue member and a second assembly mounted to the distal end of the second tongue member. Thus, in this case, hydraulic fluid has to be provided to each of the first and second locking assemblies.

In most cases planter assemblies (and agricultural implements generally) that are pulled by tractors or other types of prime movers do not come equipped with their own power plants. This is because most farmers employ many different implements and to provide a separate power plant for each implement would render the combined suite of implements far to costly for most farmers. Instead, tractors, the farmer's primary mechanical tools, are typically constructed such that they have power capacities sufficient to both transport an attached implement as well as provide power to run the implement. For instance, in the case of the planter assembly described above and in greater detail below, a tractor linked to a planter hitch assembly would provide hydraulic fluid to any planter assembly cylinders required to rotate the implement between transport and functional positions, to raise and lower support wheels, to raise and lower an implement bar, to extend and retract the telescopic tongue assembly and to control the locking assemblies. In addition, the tractor would also provide electrical power to the hydraulic valves (e.g., solenoid valves), any blower mechanisms for seed delivery, to the row unit metering devices and to any other devices requiring electrical power (e.g., tail lights, sensors, etc.).

To provide power to a planter assembly, a tractor typically comes equipped with one or, in most cases, a plurality of power or power source ports that are positioned proximate a hitch receiving member and the planter assembly is equipped with one or more power receiving ports. Power cables are then provided to link associated ports (i.e., hydraulic to hydraulic, electrical to electrical, etc.) together. Generally the planter assembly pivots about the hitch receiving assembly with respect to the tractor and therefore the power cables are constructed to flex and accommodate a degree of pivoting consistent with a minimum tractor turning radius.

As in most assemblies including power cables, in the case of a planter assembly, the power cables have to be protected from damage. For instance, if the hydraulic hose providing fluid to the internal tongue member of a multi-stage tongue assembly is severed with the tongue in the retracted and functional position (see FIG. 1), the planter assembly cannot be rotated into the transport position (see FIG. 9) and hence the assembly cannot assume a suitable configuration for transport along most roadways.

Generally, one solution for protecting a power cable has been to mount the cable such that the cable's relative juxtaposition with respect to the components that the cable is mounted to remains unchanged and such that the cable resides in a space devoid of other moving components. For instance, in the case of a hydraulic hose and a non-staged tongue assembly (i.e., a non-telescoping tongue member), the hose can be mounted directly to the external surface of the non-staged tongue member.

Unfortunately, in the case of a multi-staged tongue assembly power cable protection is a more difficult task because the tongue assembly length is variable. One solution for accommodating a variable length tongue assembly is described in U.S. patent application Ser. No. 10/101,881 which is entitled "Hose Control For Planter Apparatus" which was filed on Mar. 21, 2002, which is commonly owned with the present invention and which is incorporated herein for its teachings regarding cable routing and protection. While the protective sheath member described in the aforementioned reference protects and routes cables sufficiently adjacent a multi-staged tongue assembly, the sheath does little to restrain cables proximate other portions of the planter assembly. For instance, cables have to generally be routed from the sheath to other planter components such as hydraulically controlled markers and other components at the ends of the implement bar(s).

Fortunately, planters can generally be configured such that many of the planter cables follow a similar path for most of their length and only diverge at distal ends thereof. Thus, mounting assemblies have been configured that, in effect, bundle all of the cables together at certain points and mount the cables to adjacent planter members to restrict or minimize cable movement at those points. For instance, one mounting assembly includes a clamp member and associated relatively long bolt/nut combinations. An exemplary clamp member includes a concave member that, as its label implies, is concave to one side and forms apertures on either end of the concave member for receiving bolts. The bolts are received through the apertures and through similarly arranged apertures on a support structure (e.g., the carrier frame or some other rigid planter member) and can be secured thereto via the associated nuts with the concave side of the member facing the support structure.

This clamp-bolt/nut assembly is advantageous as the clamp assembly can be adjusted so that the size of the space between the concave member and the support structure is adjustable to accommodate variable cable configurations. For instance, two cables may be positioned within the clamp assembly and the bolts can be tightened down to secure and restrict the two cables or, in the alternative, ten cables may be fed through the clamp assembly and secured thereby to the support member.

While the clamp assembly described above has some advantages, the assembly also has several shortcomings. First, in the case of any assembly including bolt/nut combinations for securing purposes, it is desirable to completely tighten the bolt/nut combinations to ensure that the nuts do not loosen during use. This is particularly true in environments where extreme vibrations are anticipated such as in a typical agricultural environment. Thus, with a clamp type assembly like the assembly described above, to ensure that the assembly performs its function properly, the assembly must be completely tightened. Also, in this regard, it should be noted that a completely tightened clamp reduces noise caused by vibrating components that are not clamped.

Unfortunately, while necessary to ensure that the assembly remains functional, the tight assembly requirement renders the clamp type assemblies rather cumbersome to use. To this end, during configuration several components have to be manipulated at one time including the nuts and bolts, the concave member and each of several different cables. In some cases as many as ten or more cables have to be manipulated and therefore configuration is difficult. In addition, where a cable has to be added to an already configured clamp type assembly, machinations required to unclamp the assembly, insert the additional cable and re-clamp the assembly are cumbersome.

Second, most clamps have a relatively short length along an axis parallel to the concave surface of the concave member and therefore, in many cases, to ensure that the cables are aligned along a desired or optimal trajectory, two or more clamp assemblies may be required.

Third, as in the case of any mechanical assembly, in the present case, the relatively large number of components required to configure the clamp assembly increases assembly costs. This problem is particularly acute where, as indicated above, two or more clamp assemblies have to be mounted adjacent each other to ensure that cables are aligned along a desired trajectory.

Fourth, in some cases where the cables are mounted adjacent moveable planter assembly components, protective cases that form the external surfaces of the cables rub against the clamp assembly components during planter assembly movements. For instance, in the case of a pivotable implement bar where a clamp assembly is mounted to the implement bar but one end of cables passing therethrough is securely mounted to a bulkhead, when the bar is rotated, the cables may rub against the bolt shafts adjacent thereto tending to wear the external surfaces of the cables and reduce the length of the cables useful life. Where the bolt shafts are threaded, the rough threaded shaft surfaces tend to exacerbate this wearing problem.

Therefore a need exists for an apparatus that can be used to provide a cable restraining member that is versatile, inexpensive and easy to configure and employ.

SUMMARY OF THE INVENTION

It has been recognized that a simple, substantially rigid restraining assembly can be configured that forms a passageway that is large enough to easily pass a relatively large number (e.g., 15) of cables. For instance, the passageway may be formed via a plastic (e.g., PVC) conduit. The conduit can be mounted to any support member including, in the planter assembly described above, the implement bar, in a position that is generally aligned with a desired trajectory of cables passing adjacent thereto. By making the passageway substantially larger than the cross sectional area of each of the cables to pass therethrough and generally larger than the combined cross sectional areas of the cables to pass therethrough, the restraining assembly facilitates quick and versatile restraint configuration.

Consistent with the above, the invention includes an apparatus for use with an agricultural assembly including at least one rigid support member and a plurality of power cables that traverse along trajectories generally aligned with a cable trajectory adjacent a mounting segment on a mounting side of the support member, each of the power cables having a cable specific cross sectional area, the apparatus comprising a substantially rigid restraining member that forms an elongated passageway that traverses between first and second ends, the passageway defining a minimum cross sectional area that is greater than the combined cross sectional areas of the plurality of power cables and a mounting member linked to the restraining member and operable to mount the restraining member to the mounting side of the support member such that the passageway is substantially aligned with the cable trajectory, wherein, with the restraining member mounted to the support member, the cables are loosely receivable through the passageway to generally retain the cables proximate the support member.

In one aspect each of the cables may include a connector mounted to an end, at least a first connector corresponding to a first cable has a cross sectional area that is greater than the cross sectional area of the first cable and wherein, with all but the first cable passing through the passageway, the passageway cross sectional area is large enough to allow the first connector to pass therethrough. In some embodiments the first connector has a cross sectional area that is at least as small as the cross sectional area of each of the connectors corresponding to each of the cables. In other embodiments the first connector has a cross sectional area that is at least as large as the cross sectional area of each of the connectors corresponding to each of the cables.

In at least some embodiments the restraining member includes a lateral wall member that extends between the first and second ends and the lateral wall member forms at least one aperture that passes therethrough that is large enough to allow passage of the first connector. In some cases the restraining member forms a plurality of apertures and more specifically may form a cylinder having apertures formed in different sides of the cylinder.

The invention further includes an apparatus for use with an agricultural assembly including at least one rigid support member and a plurality of power cables that traverse along trajectories generally aligned with a cable trajectory adjacent a mounting segment on a mounting side of the support member, each of the power cables having a cable specific cross sectional area, the apparatus comprising a means for forming an elongated substantially rigid passageway that traverses between first and second ends, the passageway defining a minimum cross sectional area that is greater than the combined cross sectional areas of the plurality of power cables, and a means for mounting the means for forming to the mounting side of the support member such that the passageway is substantially aligned with the cable trajectory, wherein, with the means for forming mounted to the support member, the cables are loosely receivable through the passageway to generally retain the cables proximate the support member.

Moreover, the invention further includes an agricultural apparatus comprising a wheel mounted carrier platform, an implement bar mounted for pivotal motion to the carrier platform, the implement bar including a mounting segment on a mounting side, a plurality of power cables mounted to the apparatus such that the cables extend along a cable trajectory proximate the mounted segment, a substantially rigid restraining member that forms an elongated passageway that traverses between first and second ends, the passageway defining a minimum cross sectional area that is greater than the combined cross sectional areas of the plurality of power cables and a mounting member secured to the restraining member and mounted to the mounting segment of the implement bar such that the passageway is substantially aligned with the cable trajectory, wherein, with the restraining member mounted to the support member, the cables are loosely received through the passageway to generally retain the cables proximate the implement bar.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention

DETAILED DESCRIPTION OF THE PREFERRED EMBODIMENTS

Figure 1:
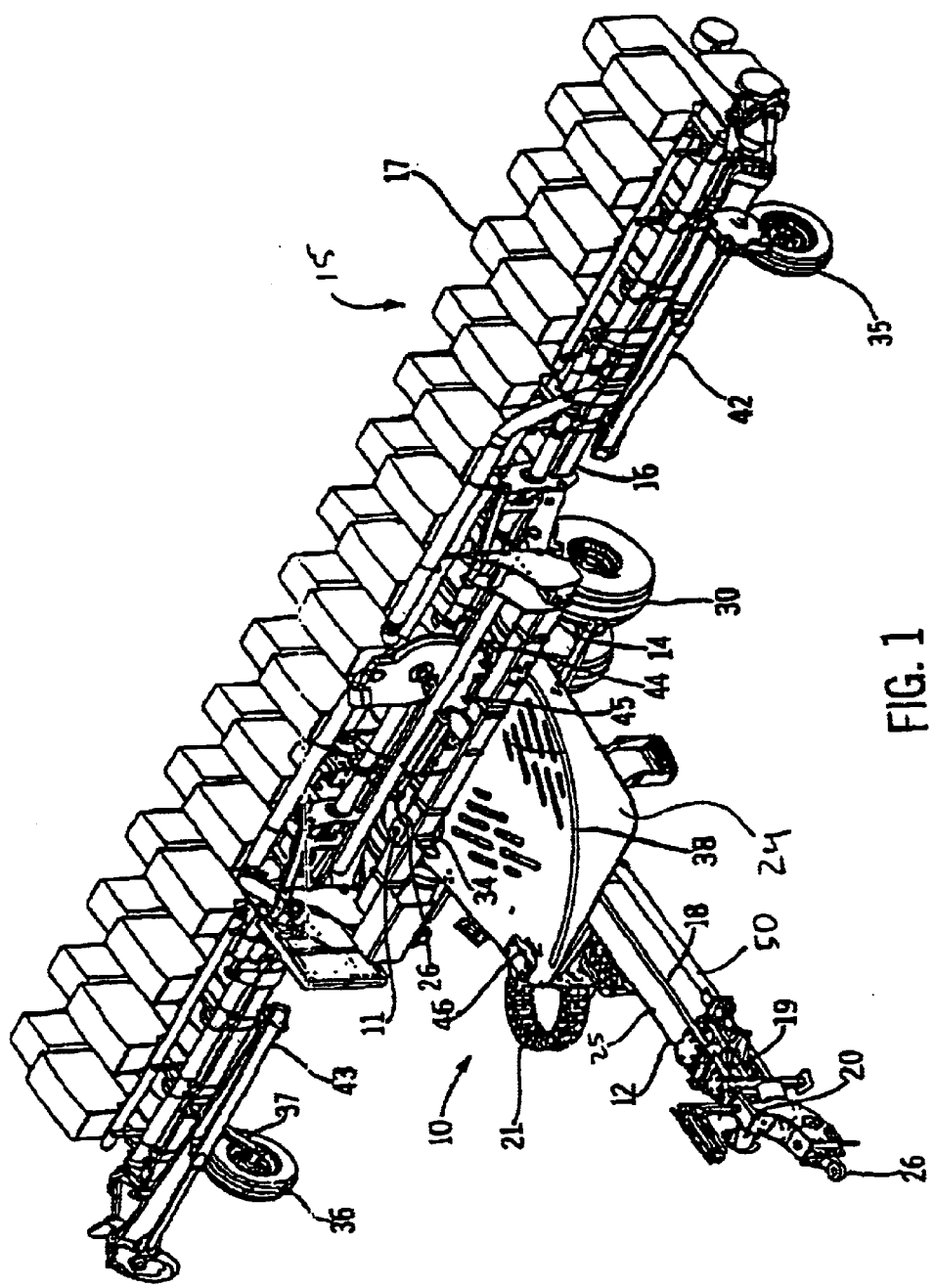
FIG. 1 is a is perspective view of a preferred embodiment of a planter apparatus constructed in accordance with one embodiment of the present invention.

Referring now to FIGS. 1 through 4, a preferred embodiment of the present invention will be described in the context of an agricultural assembly 10 which includes a carrier frame assembly 12, a main frame assembly 69 and an implement assembly 15. As its label implies, carrier frame assembly 12 includes components configured to facilitate transport or carrying of other assembly 10 components. Main frame assembly 69 includes components that generally remain with the carrier frame assembly and that are used to mount different implement assemblies thereto. As its label implies implement assembly 15 includes components used to carry out a specific agricultural process corresponding to a specific implement. For instance, the components that comprise the implement assembly may be used for tilling, fertilizing, planting, etc. Main frame assembly 69 is mounted to carrier frame assembly 12 and implement assembly 15 is mounted to main frame assembly 69.

The present invention generally resides in the carrier frame assembly 12 and, more particularly, in a power cable routing or restraining assembly 54 that is mounted to an implement bar 16 that forms part of assembly 15. In the FIGS. the restraining configuration generally includes three separate but similar restraining assemblies identified separately by numerals 54a, 54b and 54c and hereinafter sometimes referred to collectively as configuration or assembly 54. For this reason, hereinafter, first, an exemplary implement assembly 15 and the main frame assembly 69 are described in minimal detail and thereafter restraining assemblies 54 are described in greater detail.

Figure 2:
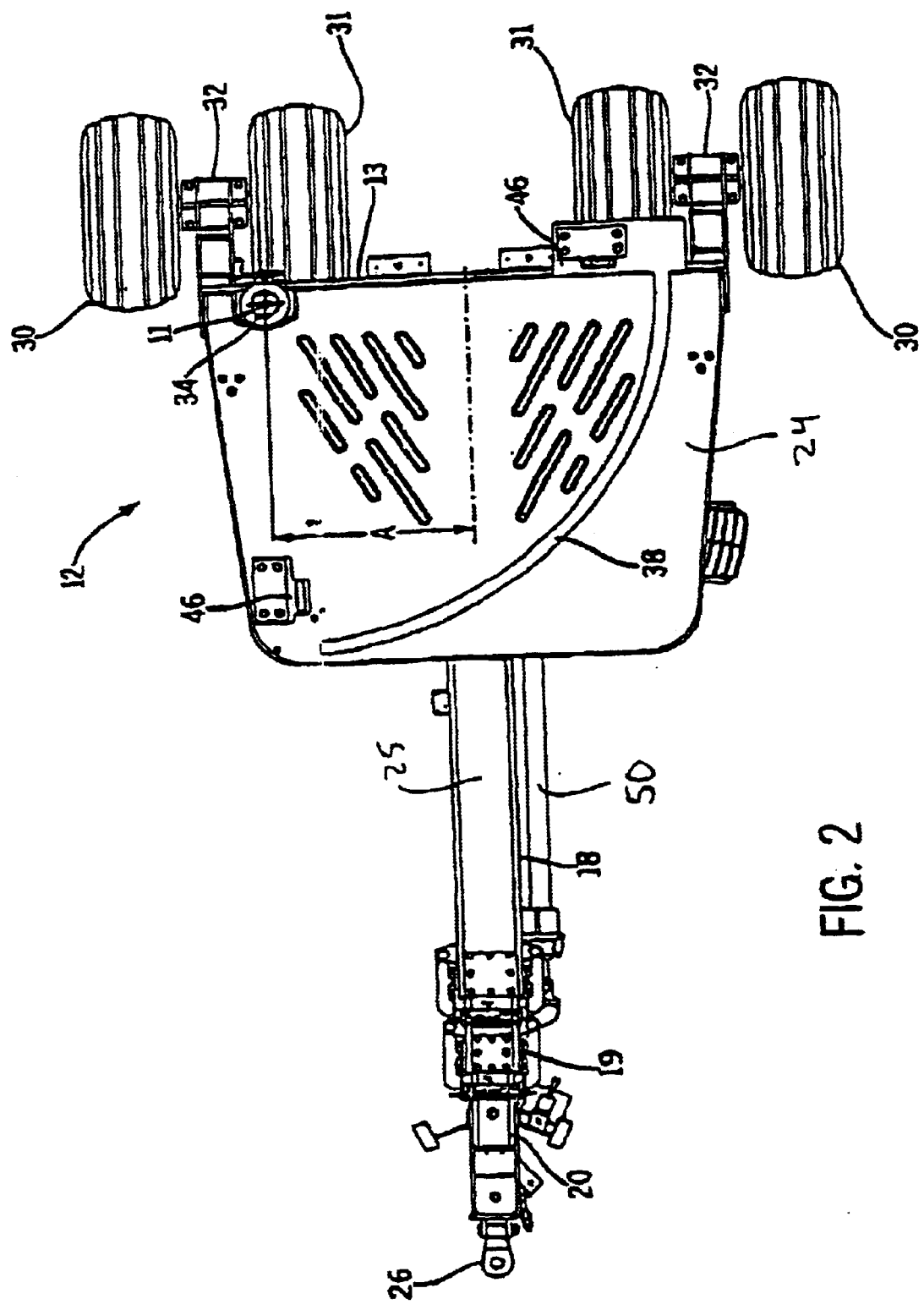
FIG. 2 is a top plan view of the carrier frame of illustrated in FIG. 1.
Figure 3:
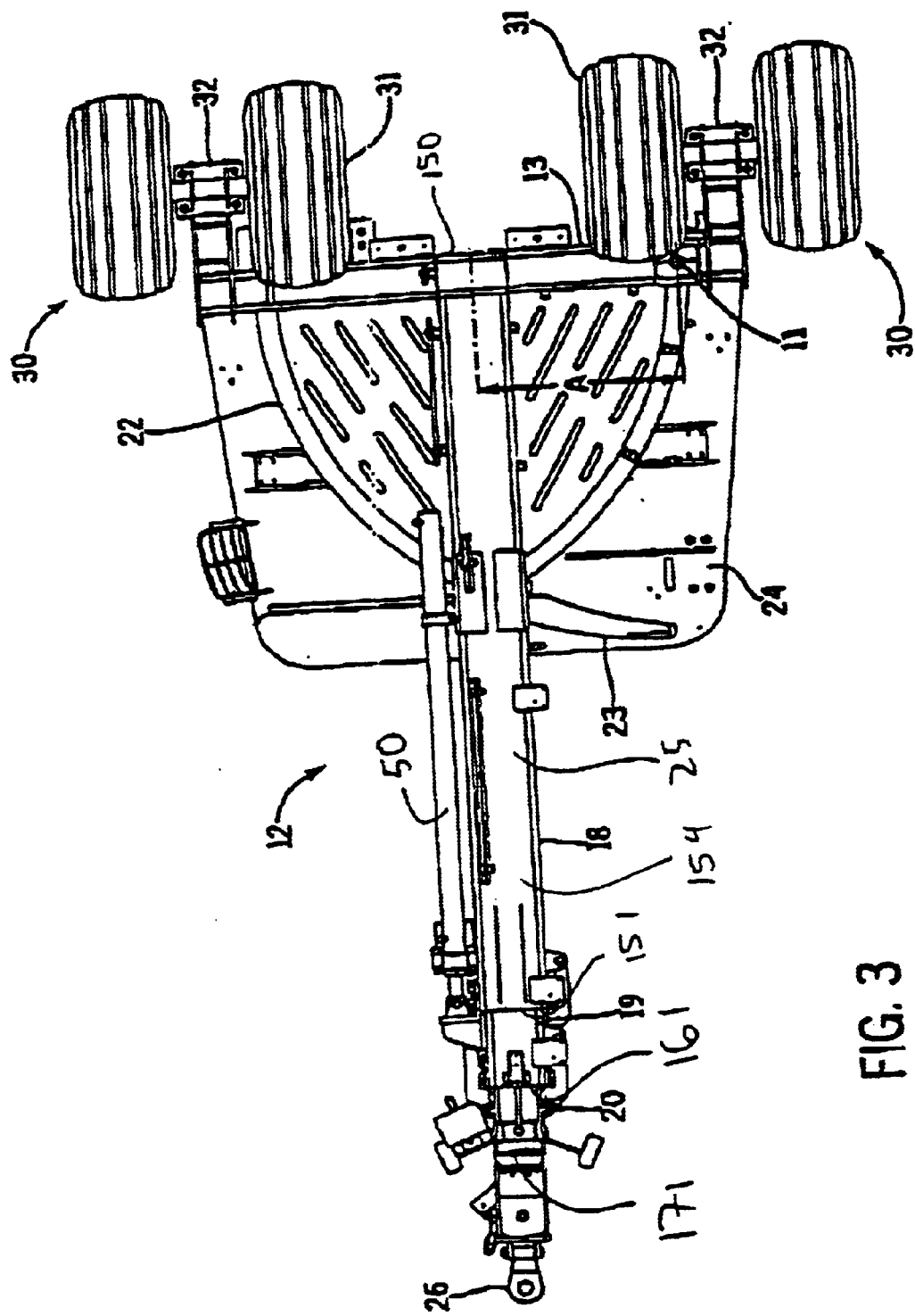
FIG. 3 is a bottom plan view of the carrier frame illustrated in FIG. 1.

Referring still to FIGS. 1 through 3 and also to FIGS. 5 through 9, the exemplary implement assembly 15 includes a bar member 16, row units 17 (e.g., planting assemblies including seed hoppers, coulters and seed metering devices), wheels 35, 36, wheel support members 37 and extendable markers 42, 43. Bar member 16 is typically a rigid steel rectilinear bar having dimensions within the six by six to ten by ten range and extends along the length of implement assembly 15. Bar 16 is generally mounted to main frame assembly 69 in any manner known in the art and the relationship between implement assembly 15 and the main frame assembly 69 is adjustable.

Wheels 35 and 36 are mounted via wheel support members 37 at opposite ends of bar 16 and are generally positionable in two positions with respect to the ground (not illustrated). First, as illustrated in the figures, wheels 35 and 36 and/or the entire implement assembly 15 may be manipulated via hydraulic cylinders or the like such that wheels 35 and 36 are in an upright position where the wheels 35 and 36 clear the ground below. Second, wheels 35 and 36 or the entire implement assembly 15 may be manipulated such that wheels 35 and 36 contact the ground below and support the ends of the implement assembly there above with implement components either above the ground or, depending on implement type, perhaps partially engaging the ground.

Markers 42 and 43, like wheels 35 and 36, are mounted at opposite ends of bar 16 and generally extend from bar 16 to a front side (see FIGS. 1, 5, etc) of the implement assembly. Operation of markers 42 and 43 is well known in the art and therefore will not be explained here in detail. Suffice it to say markers 42 and 43 may assume either a stored position (see FIG. 5) where the markers are generally retracted or an extended and operating position (not illustrated) where the markers 42 and 43 are unfolded and extend at least in part in the direction away from units 17 and toward a tractor (not illustrated) that may be attached to assembly 10.

Figure 4:
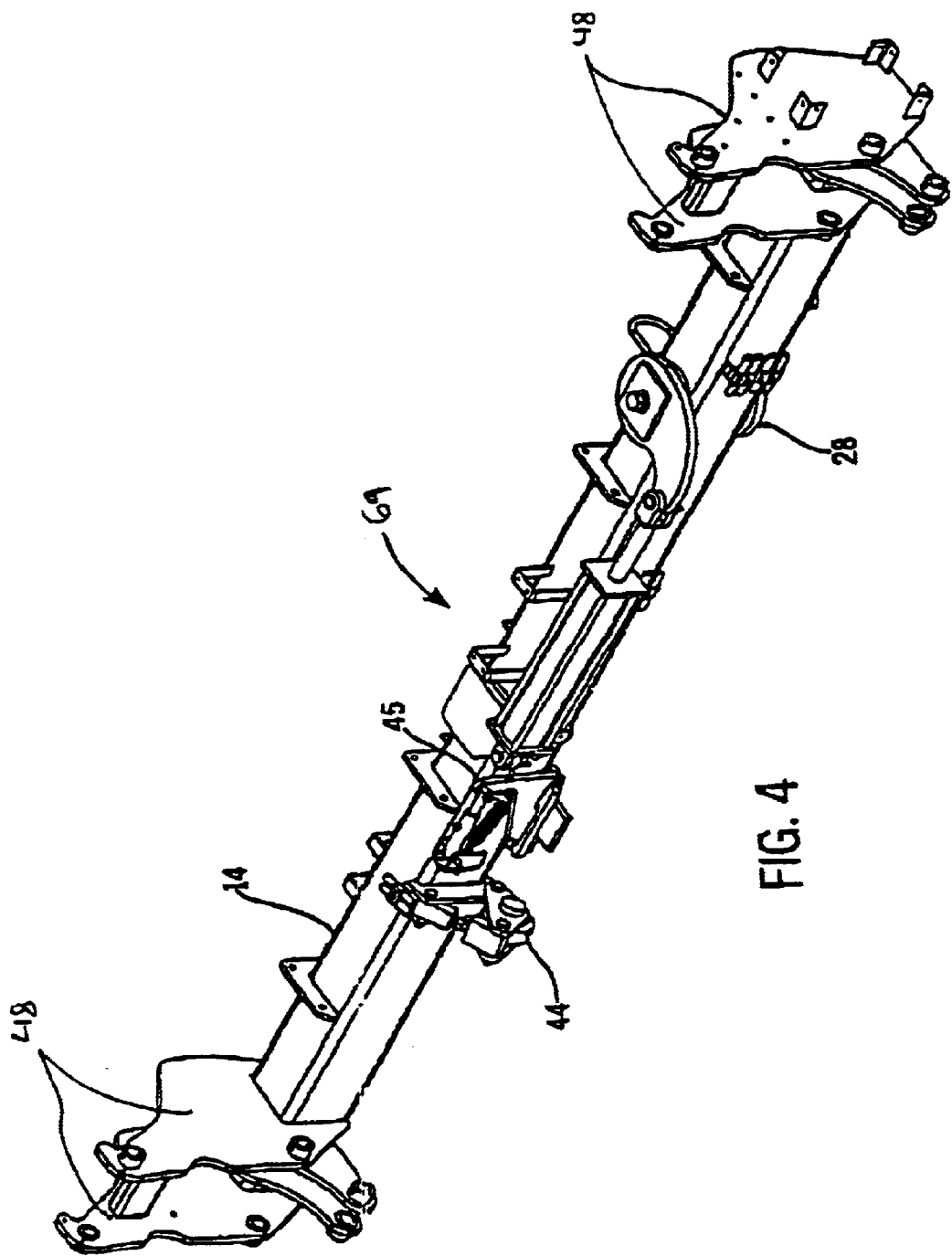
FIG. 4 is a perspective view of a mainframe assembly used with the configuration of FIG. 1.
Figure 5:
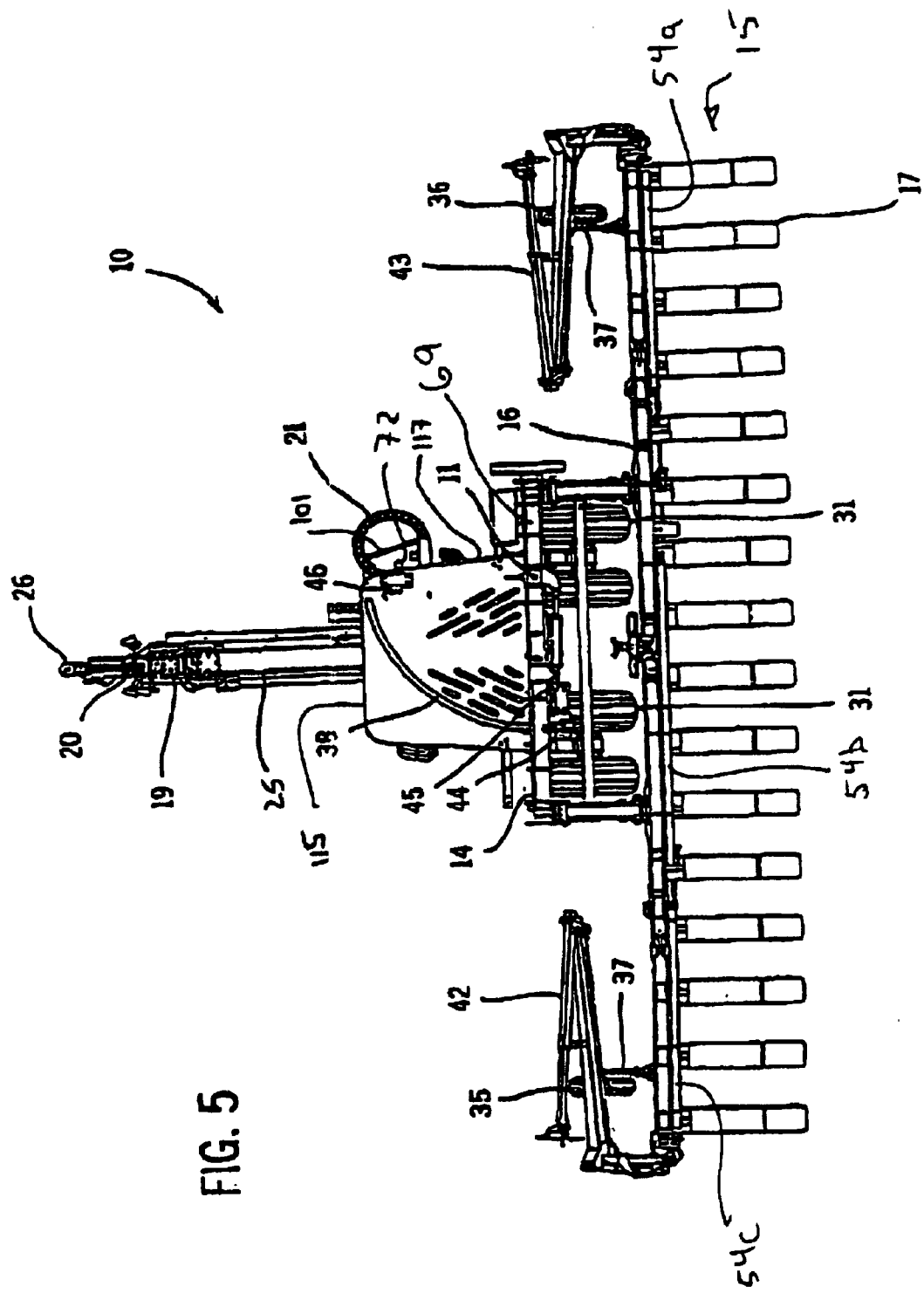
FIG. 5 is a top plan view of the embodiment of FIG. 1 in an extended operating position.
Figure 6:
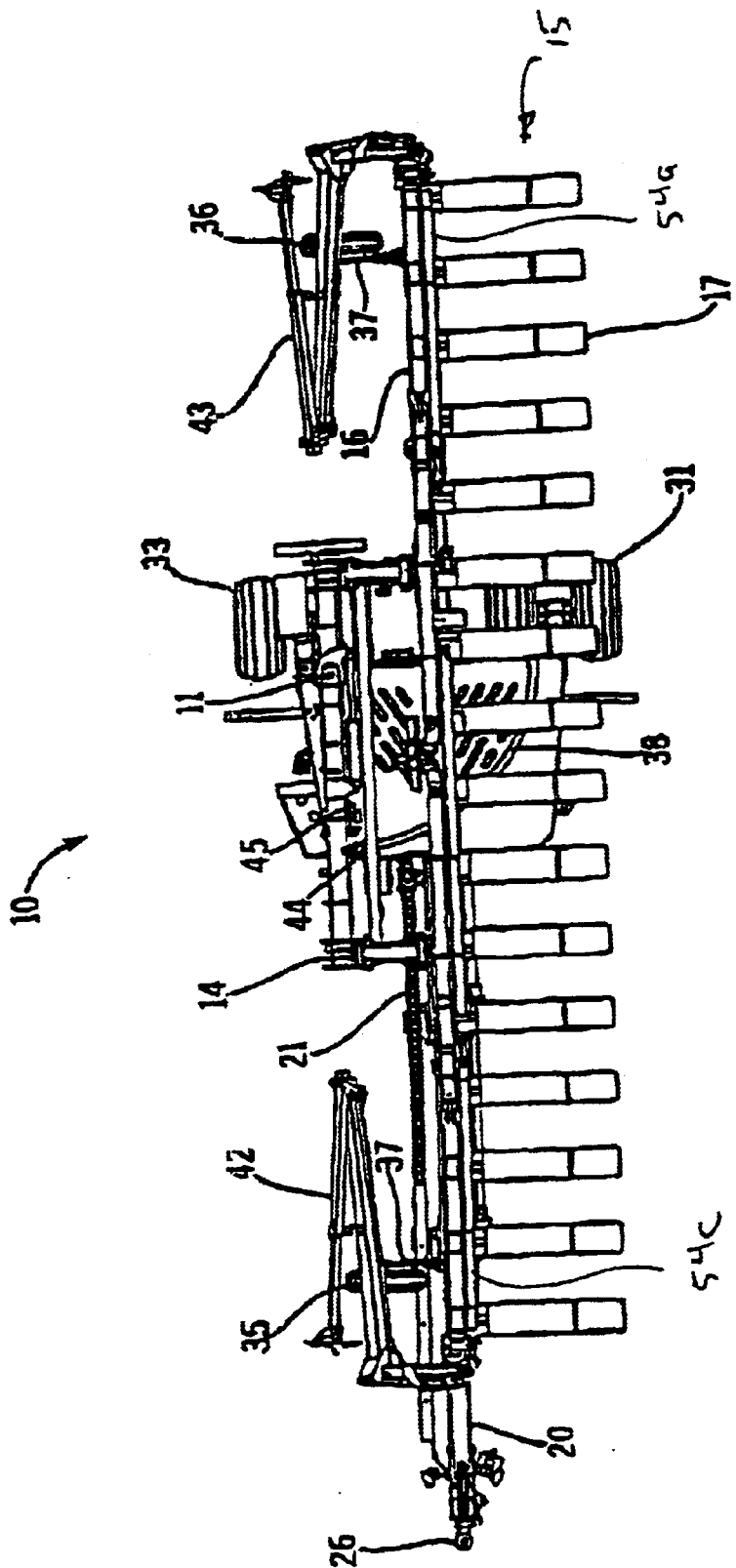
FIG. 6 is a top plan view of the embodiment of FIG. 1 in a transport position.

Referring now to FIG. 4, the main frame assembly 69 includes, among other components, a main frame bar member 14, a roller assembly 44, a latching assembly 45 and a pivot plate 28. Pivot plate 28 is mounted to an undersurface of bar member 14 about one-fourth the length of bar member 14 from a first end thereof and forms a downwardly opening pivot receiving aperture (not observable in the FIGS.) for receiving a carrier frame assembly pivot pin (see 34 in FIG. 2) which is described in more detail below. Latch assembly 45 cooperates with other system latching components (e.g., see two instances of latch 46 in FIG. 2) mounted on the carrier frame assembly 12 to lock the main frame assembly 69 and attached implement assembly 15 in either a transport position (see FIGS. 6, 8 and 9) or an operating position (see FIGS. 1 and 5). Precise configuration and operation of assembly 45 is not explained here in the interest of simplifying this explanation.

Roller assembly 44 is mounted to bar member 14 at a point about one-fourth the length of bar 14 from a second bar 14 end (not numbered) and includes at least one roller mounted for rotation in a direction substantially perpendicular to the length of bar member 14 and that is formed so as to be supportable on a track runner (e.g., 38 in FIG. 2) formed by a carrier frame platform (see platform 24 in FIGS. 2 and 3) that is explained in greater detail below. Thus, plate 28 and assembly 14 are, in the present example, essentially equispaced along the length of bar 14. Positioning of plate 28 and wheel assembly 44 is important to ensure proper balancing of the attached implement assembly 15 and is generally a function of how best to balance assembly 15 about a carrier assembly axis 310 which is also referred to herein as a transport axis and that defines a transport direction along which the tongue assembly 18 extends (see FIGS. 1 and 2).

Bar member 14 is configured so as to have means for attaching the implement assembly bar member 16 to main frame bar member 14 at either end of the main frame bar member 14. Representative views that show attachment are FIGS. 1 and 5 through 7. While many linking means are contemplated, as illustrated in FIG. 4, exemplary means include rigid, substantially vertical and upwardly extending receiving plates collectively identified by numeral 48 that extend in parallel from opposite ends of bar 14 and bolt holes (not separately numbered) for receiving some type of clamping brackets.

Figure 8:
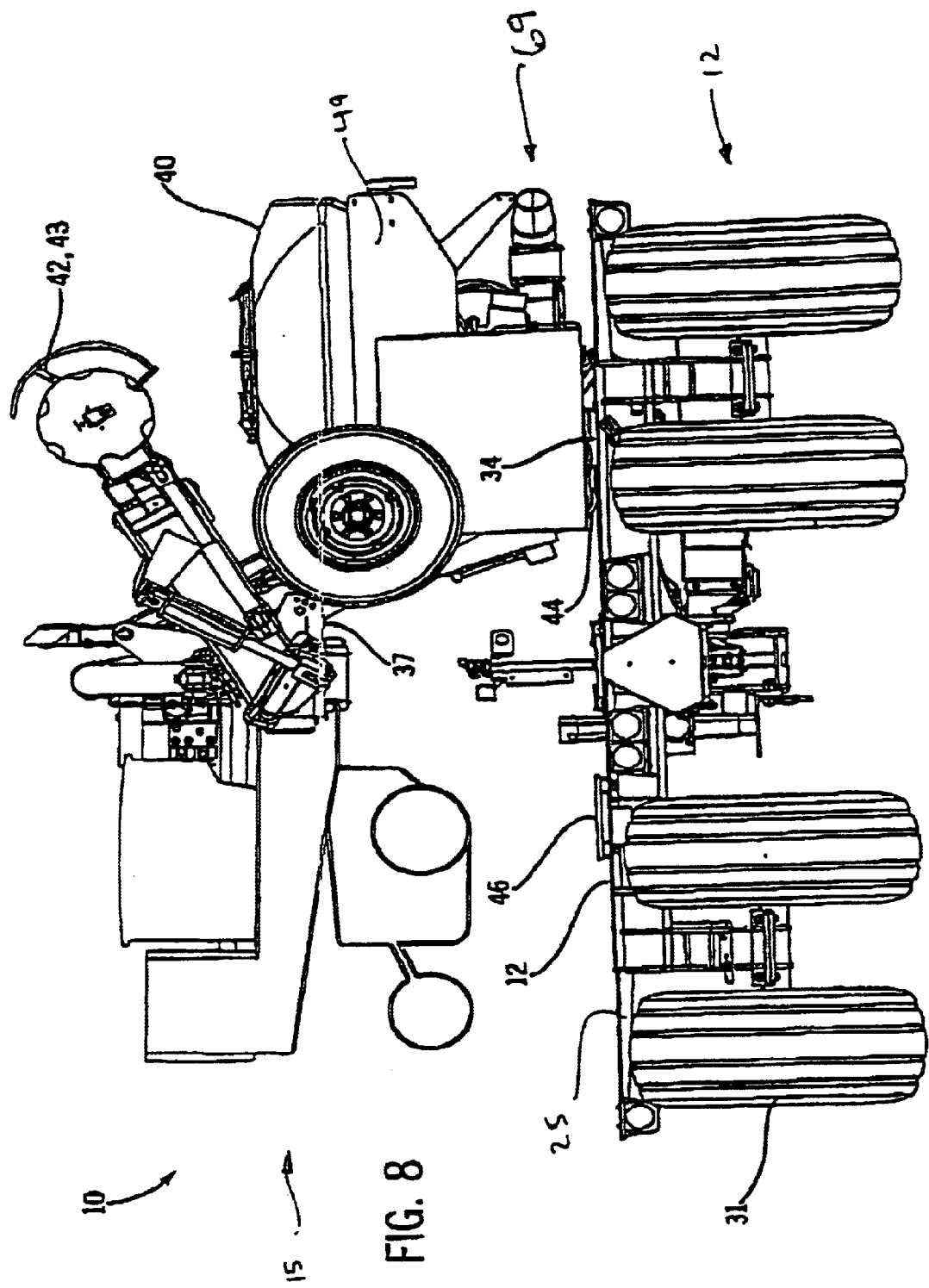
FIG. 8 is a rear perspective view of the embodiment illustrated in FIG. 1 with storage units attached and in the transport position.
Figure 9:
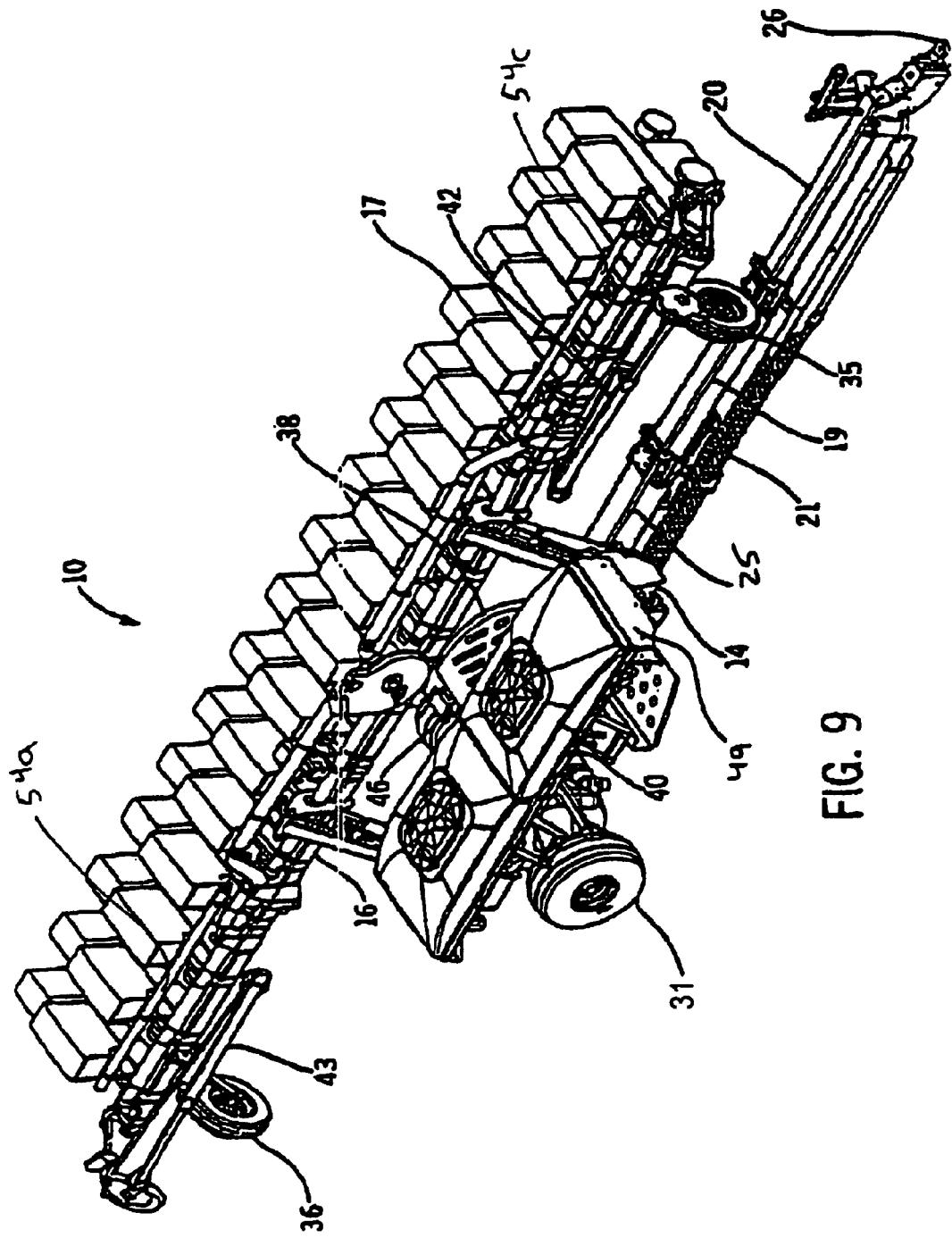
FIG. 9 is a perspective view of the embodiment of FIG. 8 with storage units in the transport position.

Referring to FIGS. 8 and 9 and also to FIG. 4, in addition to the components described above, main seed hoppers 40 are shown secured to the main frame bar 14 via brackets 49 that mount to plate members 48. Hoppers 40 receive and store seed for delivery to mini-hoppers (not separately numbered) that form part of the row units 17. While not described here in detail it should suffice to say that a pneumatic seed delivery system including a blower of some type and a network of seed delivery hoses links hoppers 40 to the mini-hoppers to automate seed delivery.

Referring still to FIGS. 1, 2, 3 and 5, carrier frame assembly 12 generally includes a cross bar 13, two wheel assemblies 30, a draw bar assembly 18 and platform 24. Each wheel assembly 30 includes an axle support member 32 and a pair of wheels 31 mounted on opposite sides of a corresponding support member 32. Cross bar 13 (see FIG. 3) is a steel elongated bar. A separate one of wheel assemblies 30 is mounted at each one of the cross bar 13 ends and extends downward therefrom so that assemblies 30 support cross bar 13 above ground.

A pivot pin 34 (see bottom end thereof in FIG. 8) is provided that extends upwardly from a top surface of bar 13. Pin 34 is formed about a vertical axis 11 and is formed so as to be receivable by the downwardly facing opening formed by pivot plate 48 (see FIG. 4) for rotation thereabout.

Referring to FIGS. 1, 2, 3, 7 and 9 draw bar assembly 18 is a two stage tongue assembly that is described in greater detail below. Suffice it to say at this time that, among other components, assembly 18 includes a first tongue member 25 having first and second ends 150 and 151 and forming a first passageway (not numbered). First tongue member 25 also forms an external surface 154. As best seen in FIG. 3, first tongue member 25 is secured at its first end 150 to a central point of cross bar 13 via welding or some other suitable securing process.

Referring to FIGS. 2, 3, 8, platform 24 is essentially a rigid flat bed member that is secured to a top surface of cross bar 13 and approximately half of first tongue member 25 proximate cross bar 13. Among other features, platform 24 forms a track runner 38 on a top surface which is reinforced on a platform undersurface (see FIG. 3) via supporting tracks 23 and 22 or in any other manner known in the art. Pivot pin 34 extends through an opening in platform 24. Referring also to FIG. 4, track runner 38 forms an arc about pivot pin 34 having a radius dimension that is identical to the space dimension between pivot plate 28 and roller assembly 44 on bar 14. Runner 38 is dimensioned so as to securely support the roller of assembly 44 in any position along the runner and thereby provide support to main frame bar 14 thereabove.

Referring still to FIGS. 2 and 4, transport and operating implement locking brackets or latches 46 are also provided on the top surface of platform 24. A transport bracket 46 is generally spaced from pivot pin 34 along a line parallel to the length of first tongue member 25 while an operating bracket 46 is generally spaced from pin 34 on the side of first tongue member 25 opposite pin 34. Each bracket 46 is formed so as to securely receive and lock to latch assembly 45 to lock the main frame assembly 69 and other components secured thereto to platform 24 in either the transport or operating positions.

Referring now to FIGS. 1, 2, 4 and 8, with carrier frame assembly 12 assembled and implement assembly 15 secured to the main frame assembly 69 as described above, the main frame bar 14 is positioned such that pin 34 is received in the opening formed by plate 28 and with the assembly 44 roller supported on runner 38. Gravity maintains main frame assembly 69 on runner 38 and some type of collar (not illustrated) on pin 34 may be provided to further ensure that assembly 69 remain secured. With wheels 35 and 36 and/or the implement assembly manipulated so that the wheels 35, 36 are off the ground, the entire main frame bar 14 and components attached thereto are moveable between the transport position illustrated in FIG. 9 to the operating position illustrated in FIG. 1 and to any intermediate position therebetween (see FIG. 7) by simply rotating main frame bar 14 about pivot pin 34. As indicated above, when in either the transport or operating positions, latch assembly 45 and one of brackets 46 cooperate to lock main frame bar 14 to carrier assembly 12 to eliminate relative movement during transport. Any means for rotating bar 14 about pin 34 may be employed. Similarly, any means for operating latch assembly 45 and for raising and lowering the implement assembly and/or the lateral support wheels 35, 36 may be employed.

Figure 7:
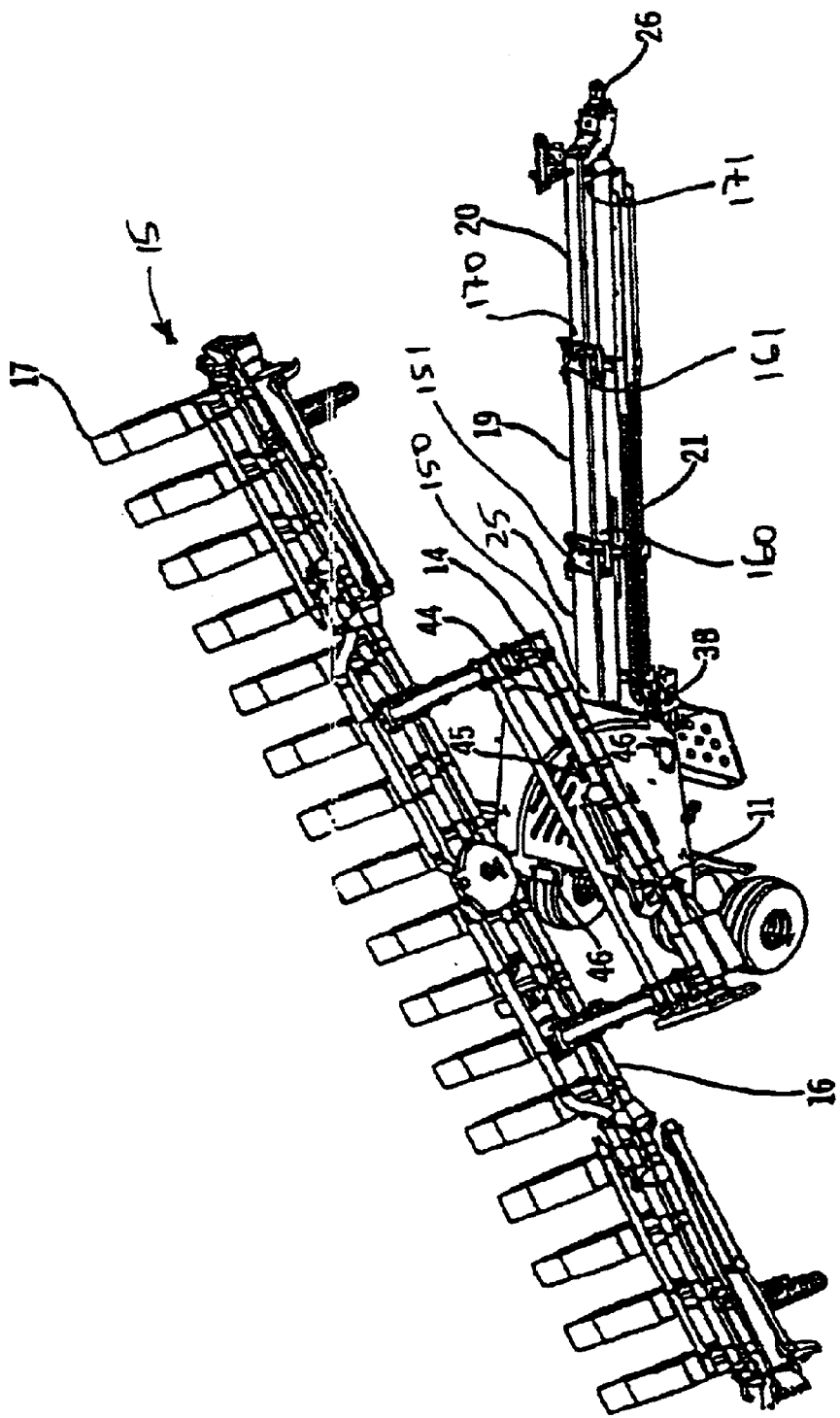
FIG. 7 is a perspective view of the embodiment of FIG. 1 in an intermediate position with an implement between the operating and the transport positions.

Referring again to FIG. 1 where the assembly is shown in the operating position, consistent with reducing the number of required headland passes needed to perform an agricultural task for an entire field, the cross bar assembly 18 is relatively short. Referring also to FIGS. 7 and 9, however, it can be seen that, in order to accommodate a long implement configuration in the transport position, the tongue assembly has to be extended.

Referring now to FIGS. 1, 2, 3, 7 and 9, an exemplary two stage tongue assembly according to the present invention includes the first tongue member 25 described above, second and third tongue members 19 and 20, respectively, a hitch assembly 26 and a first hydraulic tongue cylinder 50 and a second hydraulic tongue cylinder not shown.

First member 25 has first and second ends 150 and 151, an external surface 154, forms a first passageway (not numbered) and is secured to a central point on cross bar 13. Second tongue member 19 has first 160 and second 161 ends, an external surface and forms a second passageway (160) while third tongue member 20 has first (170) and second 171 ends, has an external surface and forms a third passageway (not numbered). Hitch assembly 26 is secured to the second end 171 of third tongue member 20. Attached to the two-stage tongue is a power cable control system 21 that retracts during implement operation and extends during transport and that is described in greater detail below. Referring to FIG. 7, third tongue member 20 is dimensioned to be received within the second tongue member passageway with minimal clearance while second tongue member 19 is dimensioned to be received within the first tongue member passageway.

Referring once again to FIGS. 1, 2 and 3, first cylinder 50 includes a rod that extends therefrom to a distal end and is double acting meaning that the cylinder 50 is plumbed so that the rod can be forced to either extend or retract. Similarly, a second cylinder (not illustrated) includes a rod having a distal end and that is double acting. The second hydraulic cylinder is generally mounted within the third tongue member passageway. More detail regarding an exemplary multi-stage tongue assembly that may be used with the present invention is described in the related reference identified above and entitled "Planter Hitch Apparatus" which is incorporated herein by reference in its entirety.

An exemplary power cable system that may be used to provide power (e.g., hydraulic fluid, electrical power, etc.) to assembly 10 is described in detail in U.S. patent application Ser. No. 10/101,881 which is entitled "Hose Control For Planter Apparatus", which was filed on Mar. 21, 2002 and which is commonly owned and incorporated herein by reference. For the purposes of the present invention it should suffice to say that, referring to FIG. 10, a plurality cables 75 that are linked to ports on a tractor or some other type of prime mover (not illustrated) are routed through a bracket 66 and down through cable control system 21 (system 21 including trough member 61 and sheath member 58), out an end 59 of assembly 21 and back to a bulkhead 56. The cables 75 pass from a back side of bulkhead 56 through a bracket 131 to another bulkhead 67 that is mounted to and for movement with main bar member 14. While the cables are identified via single line 75, it should be appreciated that line 75 generally represents a plurality of cables and will likely represent a variable number of cables, the number of cables being a function of the configuration 10.

Figure 10:
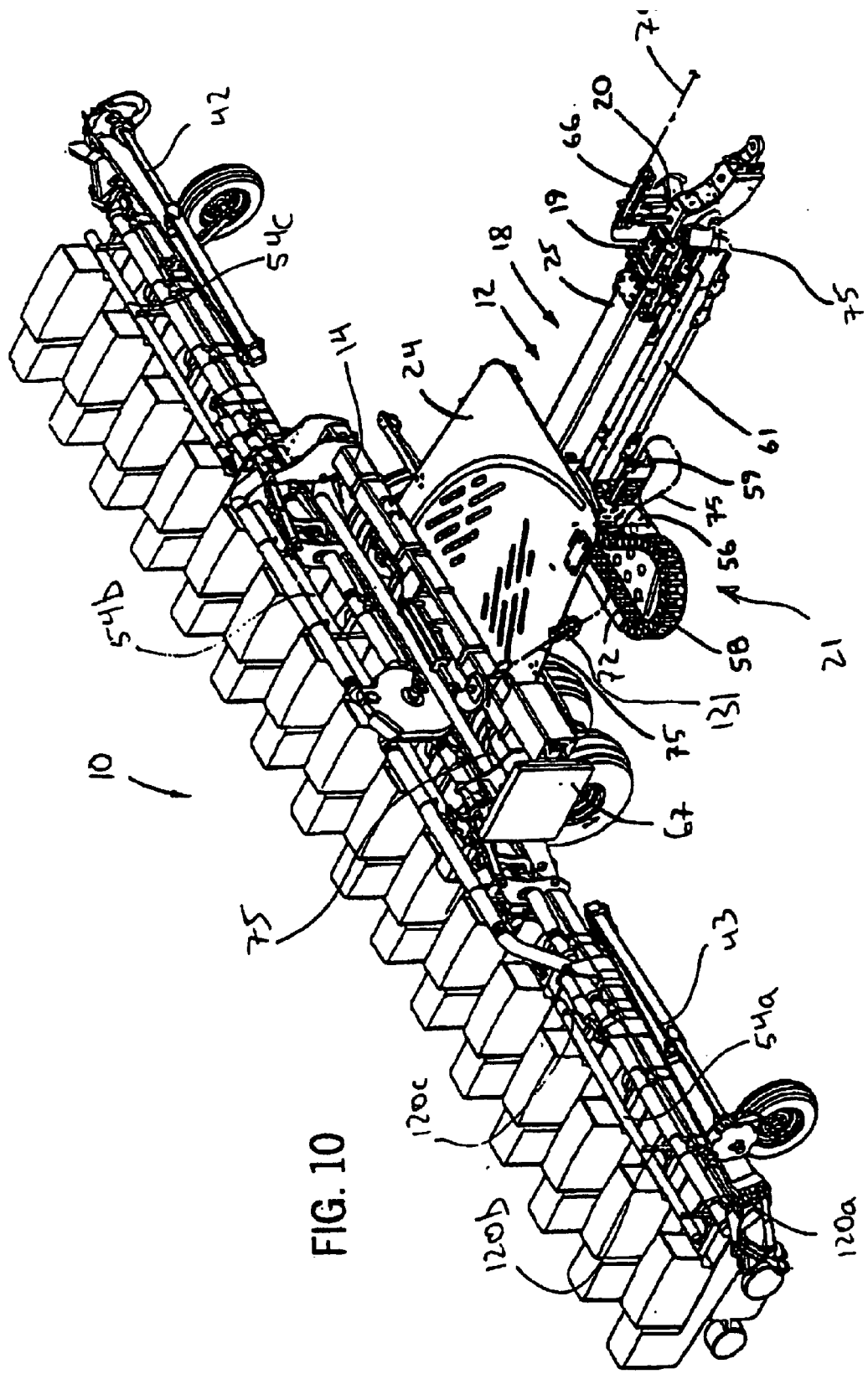
FIG. 10 is a perspective view of the power cable control system shown in the operation position of the agricultural apparatus.

Referring still to FIG. 10, from bulkhead 67 at least some of the cables 75 are routed along the implement bar 16 in either direction to distal ends or some intermediate point thereof. For instance, separate hydraulic cables may extend in either direction from bulkhead 67 to markers 42 and 43 for controlling markers 42 and 43. The present invention resides in the restraining members or assemblies 54a, 54b and 54c that are mounted along bar 16. As illustrated, restraining assembly 54b is centrally mounted along bar 16 and generally extends along the segment of bar 16 that supports the eight central most row units 17. Assembly 54a is mounted to one end of bar 16 and extends along a segment that supports four end row units and assembly 54c is similarly mounted to the other end of bar 16. Cables from bulkhead 67 may be fed through central assembly 54b to the other assemblies 54a and 54c or may simply fed directly to one of end assemblies 54a or 54c. Each of assemblies 54a, 54b and 54c are similarly constructed and operate and are used in a similar fashion and therefore, in the interest of simplifying this explanation, only assembly 54a will be described in detail.

Figure 11:
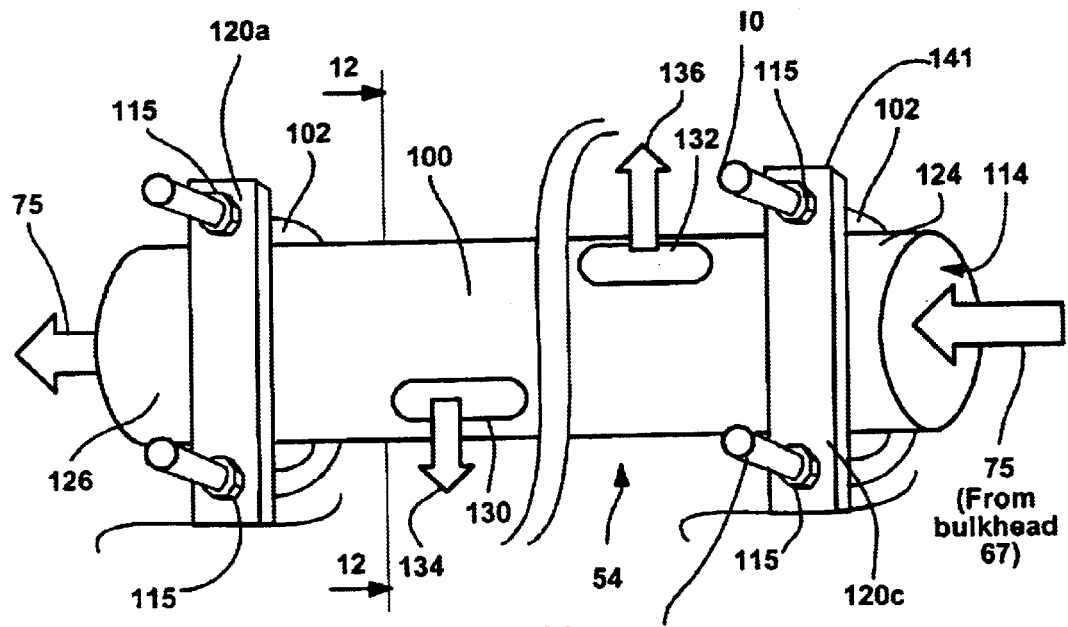
FIG. 11 is a perspective view of an embodiment of the restraining assembly of FIG. 10.
Figure 12:
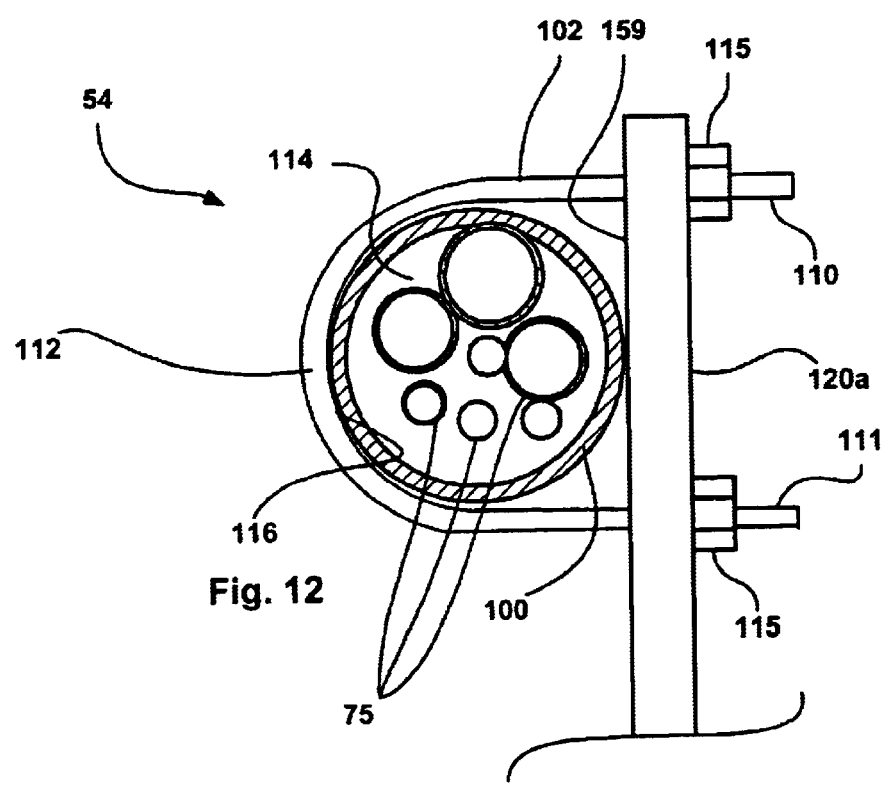
FIG. 12 is a partial cross-sectional view taken along the line 12—12 of FIG. 11.
Figure 13:
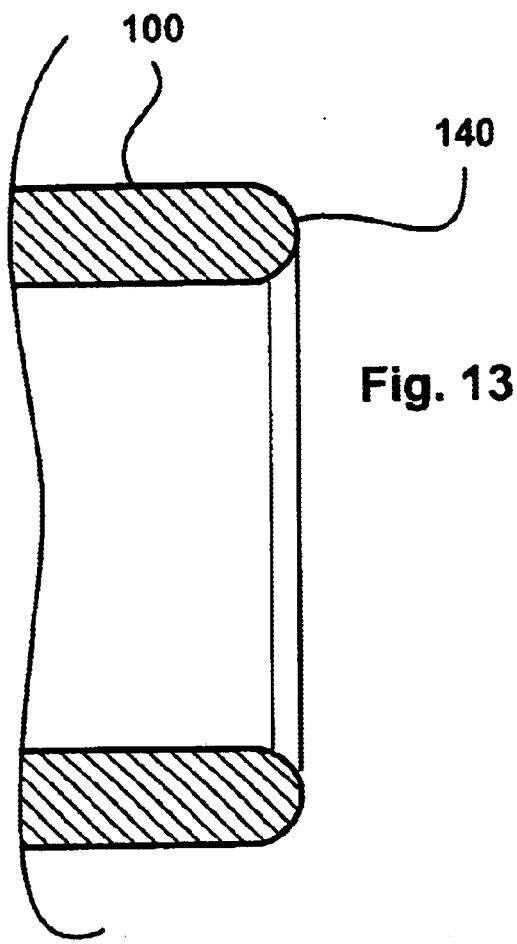
FIG. 13 is a partial cross-sectional view of an end of the restraining member in FIG. 11.

Referring also to FIGS. 11 and 12, an exemplary embodiment of restraining assembly 54a is illustrated and, generally, includes a restraining member 100 and a mounting member or assembly including, mounting supports or extensions 120a, 120b and 120c, a plurality of substantially U-shaped brackets collectively identified by numeral 102 and a plurality of nuts collectively identified by numeral 115. Restraining member 100 is generally annular or conduit shaped and forms a passageway 114 that extends from a first end 124 to a second end 126. Member 100 can be formed of any rigid material but, preferably, is formed using a plastic or PVC pipe and may be of various lengths. In at least one embodiment, the length of member 100 is approximately three to eight feet. Also, in at least one embodiment, the diameter of passageway 114 is approximately 3½ to 5 inches. Referring also to FIG. 13, in at least one embodiment, the edges 140 of restraining member 100 are rounded. By rounding the edges 140, wear and tear on cables passing through passageway 114 is substantially minimized.

Referring still to FIGS. 11 and 12 and also to FIG. 10, mounting supports 120a, 120b and 120c are similarly constructed and operate in a similar fashion and therefore only support 120c will be described in detail to simplify this explanation. It should suffice to say supports 120a, 120b and 120c are spaced along bar 16 adjacent the corresponding four end row units 17 and are rigidly secured to bar 16 along a mounting section. Support 120c extends up from bar 16 to a distal end and forms two apertures (not illustrated) for receiving distal ends of a U-shaped bracket 102 (see FIGS. 11 and 12). Generally, the apertures formed by support 120c are spaced such that restraining member 100 can be placed therebetween.

Clamp or bracket member 102 is generally U-shaped including a concave central member 112 that forms a concave surface 116 and distal ends 110 and 111. Each of ends 110 and 111 is threaded and sized to receive one of nuts 115 and, as indicated above, ends 110 and 111 are separated such that ends 110 and 111 simultaneously align with apertures formed in support 120c. As illustrated in FIG. 12, a separate end 110, 111 passes through a separate one of the apertures in support 120c and a separate nut 115 is received and securely tightened to each of the ends 110 and 111. Bracket 102 is sized and shaped to receive a lateral side of restraining member 100.

As illustrated in FIGS. 11 and 12, to assemble assembly 54, first supports 120a–120c are mounted to bar 16 so that they extend upward therefrom and are generally aligned with each other. Thereafter, restraining member 100 is placed against a bearing surface (i.e., see 159 in FIG. 12) of each of supports 120a–120c and between apertures formed thereby. U-shaped brackets 102 are placed over restraining member 100 such that distal ends 110, 111 ass through corresponding apertures. Next, nuts 115 are used to secure U-shaped brackets 102 to supports 120a–120c, thereby securing restraining member 100 to bar 16. Hoses and other types of power cables 75 are fed through passageway 114 from bulkhead 67 to other assembly 10 components or visa versa.

Figure 14:
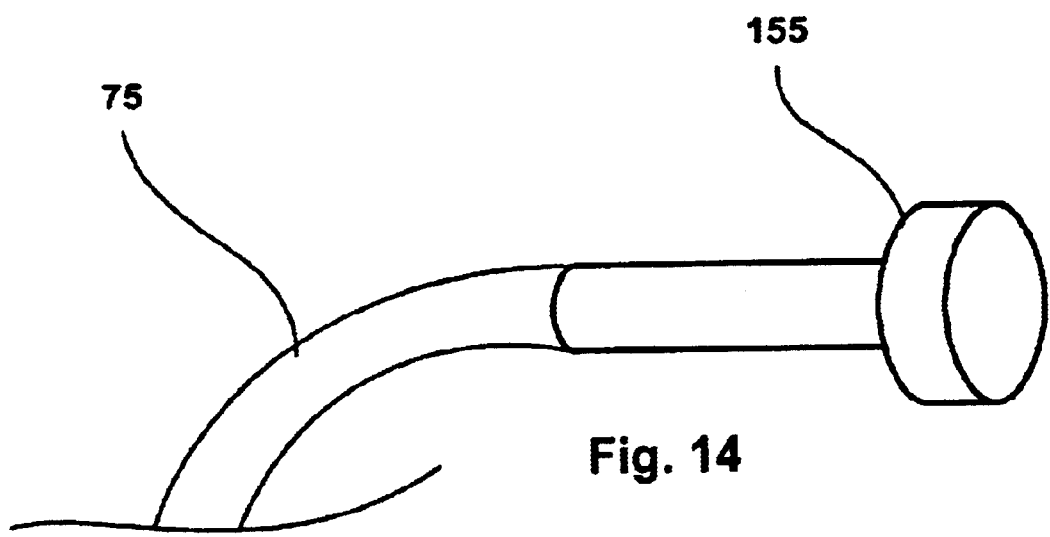
FIG. 14 is a perspective view of a connector corresponding to one power cable.

Importantly, the uniform cross-sectional area of passageway 114 is greater than the combined cross-sectional areas of the power cables 75 that pass therethrough. More particularly, referring to FIG. 14, according to at least one embodiment of the present invention, each of the power cables 75 includes a connector 155 at an end that is passed through passageway 114 where the connector has a cross-sectional area which is greater than the corresponding cable 75 and the cross-sectional area of passageway 114 is greater than the combined cross-sectional areas of all of the cables 75 except a first the cables plus the cross-sectional area of the connector 155 corresponding to the first of the cables. The connector corresponding to the first of the cables may be either the largest or the smallest of the connectors in terms of cross-sectional area or may be any other size connector in between.

Referring now to FIG. 11, in at least one embodiment, a lateral wall of restraining member 100 forms at least one and perhaps several apertures that pass therethrough. In FIG. 11, two exemplary apertures are identified by numerals 130 and 132. Apertures 130 and 132 are provided so that at least one and perhaps more than one of the cables passing in first end 124 may be extended in a direction other than the direction out second end 126. For instance, two directions in FIG. 11 that correspond to apertures 130 and 132 are identified by numerals 134 and 136, respectively. Referring still to FIG. 11 and also to FIG. 10, cables may be passed through apertures like apertures 130 and 132 to direct the cables to a space either above or below bar 16.

While the drawings, specific examples, and particular formations given describe exemplary embodiments, they serve the purpose of illustration only. The materials and configurations shown and described may differ depending on the chosen performance characteristics and physical characteristics of the planter equipment. For example, the type of planter equipment may differ. In addition, other cross-sectional shapes (e.g., rectilinear) may be extruded to form restraining member 100. Moreover, the edges of member 100 need not be rounded.

What is claimed is:

1. An agricultural apparatus adapted for movement across a field in a forward direction of travel, the apparatus comprising:
    a wheel mounted carrier platform;
    an elongate implement bar mounted for pivotal motion relative to the carrier platform, the implement bar generally extending perpendicular to the forward direction of travel and including a mounting segment on a mounting side, the implement bar adapted to support a plurality of implements affixed at spaced intervals along the length thereof;
    a plurality of power cables mounted to the apparatus such that the cables extend along a cable trajectory generally parallel to and proximate to the mounting segment, respective power cables extendable to the implements to provide power thereto;
    an elongate substantially rigid restraining member that forms an elongated generally confining passageway that traverses between first and second ends thereof, the passageway defining a minimum cross sectional area that is greater than the combined cross sectional areas of the plurality of power cables, the restraining member further comprising a wall member that extends between the first and second ends, the wall member including a plurality of apertures therethrough, the plurality of apertures traversing in a non-aligned configuration between the first and second ends of the rigid restraining member, wherein at least one of the plurality of apertures being of a size to allow passage of at least one of the power cables; and
    a mounting member secured to the restraining member and mounted to the mounting segment of the implement bar such that the passageway is substantially aligned with the cable trajectory,
    wherein the power cables are loosely received through the passageway to generally retain the cables proximate the implement bar.

2. The apparatus of claim 1 wherein the passageway defines a substantially uniform cross sectional area along its entire length.

3. The apparatus of claim 2 wherein the restraining member is several feet long and extends along a segment of the implement bar.

4. The apparatus of claim 3 wherein respective power cables may be extended along and within the passageway to a selected any one of the plurality of apertures adjacent individual implements and then extended through the selected aperture for connection to the adjacent implements.

5. The apparatus of claim 4 wherein the wall member forms a cylinder and the apertures are formed in varying non-aligned positions along the length of the cylinder.

6. The apparatus of claim 5 wherein the implement bar is centrally mounted to the carrier platform, the restraining member is a first restraining member mounted to extend along the implement bar to a first side of the carrier platform and the apparatus further includes a second restraining and second mounting member where the second mounting member mounts the second restraining member to the implement bar to extend to a second said of the carrier platform opposite the first side of the carrier platform.

7. The apparatus of claim 6 also for use wherein the apparatus is a planter.

8. The apparatus of claim 1 wherein each of the cables includes a connector mounted to an end, at least a first connector corresponding to a first cable has a cross sectional area that is greater than the cross sectional area of the first cable and wherein, with all but the first cable passing through the passageway, the passageway cross sectional area is large enough to allow the first connector to pass therethrough.

9. The apparatus of claim 8 wherein the passageway defines a substantially uniform cross sectional area along its entire length.

10. The apparatus of claim 9 wherein respective power cables may be extended along the passageway to a selected any one of a plurality of apertures adjacent individual implements and then extended through the selected aperture for connection to the adjacent implement.

11. The apparatus of claim 10 wherein the restraining member is several feet long and extends along a segment of the implement bar.

12. The apparatus of claim 11 wherein the implement bar is centrally mounted to the carrier platform, the restraining member is a first restraining member mounted to extend along the implement bar to a first side of the carrier platform and the apparatus further includes a second restraining and second mounting member where the second mounting member mounts the second restraining member to the implement bar to extend to a second side of the carrier platform opposite the first side of the carrier platform.

13. An agricultural planting apparatus adapted for movement across a field in a forward direction of travel, the planting apparatus comprising:
    a wheel mounted carrier platform;
    an elongate toolbar mounted for pivotal motion relative to the carrier platform, the toolbar normally generally perpendicular to the forward direction of travel a having a mounting segment on a mounting side, the toolbar supporting a plurality of planter units affixed at spaced intervals along the length thereof;
    a plurality of power cables mounted to the apparatus such that the cables extend along a cable trajectory generally parallel to and proximate the mounting segment of the toolbar, respective power cables extendable to the planter units to provide power thereto;

an elongate substantially rigid restraining member that traverses between a first end and a second end, a plurality of apertures configured therethrough and traversing in a non-aligned configuration between the first and second ends, the restraining member forming an elongated generally tubular passageway that also traverses between the first and second ends of the restraining member, the passageway defining a minimum cross sectional area that is greater than the combined cross sectional areas of the plurality of power cables, whereby respective power cables may be extended along the passageway to a selected any one of the plurality of apertures adjacent individual implements and then extended through the selected aperture for connection to the adjacent implements, the restraining member further being several feet long and extending along a segment of the toolbar; and a mounting member secured to the restraining member and mounted the mounting to segment of the toolbar such that the passageway is substantially aligned with the cable trajectory, whereby the power cables are loosely received through the passageway to generally retain the cables proximate the toolbar.

14. The apparatus of claim 13 wherein the toolbar is centrally mounted to the carrier platform, the restraining member is a first restraining member mounted to extend along the toolbar to a first side of the carrier platform and the apparatus further includes a second restraining and second mounting member where the second mounting member mounts the second restraining member to the toolbar to extend to a second side of the carrier platform opposite the first side of the carrier platform.

15. An agricultural apparatus adapted for movement across a field in a forward direction of travel, the apparatus comprising:

a wheel mounted carrier platform;

an elongated implement bar mounted for pivotal motion relative to the carrier platform, the implement bar normally generally extending perpendicular to the forward direction of travel and including a mounting segment on a mounting side, the implement bar adapted to support a plurality of implements affixed at spaced intervals along the length thereof;

a plurality of power cables mounted to the apparatus such that the cables extend along a cable trajectory generally parallel to and proximate the mounting segment, respective power cables extendable to the implements to provide power thereto;

a first elongated substantiall rigid restraining member, the restraining member including at least one wall member, the wall member defining an elongated generally confining passageway that traverses between first and second ends thereof, the passageway defining a minimum cross sectional area that is greater than the combined cross sectional areas of the plurality of power cables, the wall member further defining a first surface that traverses between the first and the second ends thereof, the first surface including a plurality of apertures configured therethrough, the plurality of apertures traversing in a non-aligned configuration between the first and the second ends thereof, the plurality of apertures being large enough to allow passage of at least one of the power cables therethrough; and a first mounting member secured to the restraining member and mounted to the mounting segment of the implement bar such that the passageway is substantially aligned with the cable trajectory, wherein the power cables are loosely received through the passage way to generally retain the cables proximate the implement bar.

16. The apparatus of claim 15 wherein the passageway defines a substantially uniform cross sectional area along its entire length.

17. The apparatus of claim 16 wherein the restraining member is several feet long and extends along a segment of the implement bar.

18. The apparatus of claim 17 wherein respective power cables may be extended along and within the passageway to a selected any one of the plurality of apertures adjacent individual implements and then extended through the selected aperture for connection to the adjacent implements.

19. The apparatus of claim 18 wherein the first surface defined by the wall member forms a cylinder and the plurality of apertures are formed in non-aligned configurations along the length of the cylinder.

20. The apparatus of claim 19 wherein the implement bar is centrally mounted to the carrier platform, the first restraining member being mounted to extend along the implement bar to a first side of the carrier platform, and wherein the apparatus further includes a second restraining member and a second mounting member, the second mounting member mounting the second restraining member to the implement bar to extend to a second side of the carrier platform opposite the first side of the carrier platform.

21. The apparatus of claim 20 also for use wherein the apparatus is a planter.

22. The apparatus of claim 15 wherein each of the cables includes a connector mounted to an end, at least a first connector corresponding to a first cable, the first connector having a cross sectional area greater than the cross sectional area of the first cable, and wherein with all but the first cable passing through the passageway, the cross sectional area of the passageway being large enough to allow the first connector to pass therethrough.

23. The apparatus of claim 22 wherein the passageway defines a substantially uniform cross sectional area along its entire length.

24. The apparatus of claim 23 wherein respective power cables may be extended along and within the passageway to a selected any one of the plurality of apertures adjacent individual implements and then extended through the selected aperture for connection to the adjacent implements.

25. The apparatus of claim 24 wherein the first restraining member is several feet long and extends along a segment of the implement bar.

26. The apparatus of claim 25 wherein the implement bar is centrally mounted to the carrier platform, the first restraining member being mounted to extend along the implement bar to a first side of the carrier platform, and wherein the apparatus further includes a second restraining member and a second mounting member, the second mounting member mounting the second restraining member to the implement bar to extend to a second side of the carrier platform opposite the first side of the carrier platform.

27. An agricultural apparatus adapted for movement across a field in a forward direction of travel, the apparatus comprising:

a wheel mounted carrier platform;

an elongate implement bar mounted to the carrier platform, the implement bar adapted to support a plurality of implements affixed at spaced intervals along the length thereof;

at least one power cable mounted to the apparatus, the power cable extendable to at least one of the implement to provide power thereto; and an elongate substantially rigid restraining member that forms an elongated generally confining passageway that traverses between first and second ends thereof, the rigid restraining member including a plurality of apertures therethrough, the plurality of apertures traversing in a non-aligned configuration between the first and second ends of the rigid restraining member, wherein the power cable may be extended along the passageway to a selected any one fo the plurality of apertures adjacent individual implements and then extended through the selected aperture for connection to the adjacent implements.

* * * * *